United States Patent
Skorina et al.

(10) Patent No.: US 11,459,465 B2
(45) Date of Patent: Oct. 4, 2022

(54) ROOF COATING COMPOSITION, METHODS OF USE, AND ARTICLES

(71) Applicant: 3M INNOVATIVE PROPERTIES COMPANY, St. Paul, MN (US)

(72) Inventors: Taisiya Skorina, Woodbury, MN (US); Rebecca L. A. Everman, Falcon Heights, MN (US); Jean A. Tangeman, Minneapolis, MN (US); Kenton D. Budd, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/638,776

(22) PCT Filed: Nov. 2, 2018

(86) PCT No.: PCT/IB2018/058632
§ 371 (c)(1),
(2) Date: Feb. 13, 2020

(87) PCT Pub. No.: WO2019/092568
PCT Pub. Date: May 16, 2019

(65) Prior Publication Data
US 2021/0130623 A1    May 6, 2021

Related U.S. Application Data

(60) Provisional application No. 62/584,295, filed on Nov. 10, 2017.

(51) Int. Cl.
*C09D 5/33*     (2006.01)
*B05D 3/02*     (2006.01)
(Continued)

(52) U.S. Cl.
CPC ........... *C09D 5/004* (2013.01); *B05D 3/0254* (2013.01); *B05D 3/108* (2013.01); *B05D 5/06* (2013.01);
(Continued)

(58) Field of Classification Search
CPC ........ B05D 3/0254; B05D 3/108; B05D 5/06; B05D 7/14; C09D 1/02; C09D 5/004; E04D 7/00
See application file for complete search history.

(56) References Cited

U.S. PATENT DOCUMENTS 4,478,905 A   10/1984   Neely, Jr.
7,388,063 B2   6/2008   Zanghellini
(Continued)

FOREIGN PATENT DOCUMENTS

CA   2800585   6/2013
CA   2871737   11/2013
(Continued)

OTHER PUBLICATIONS

"Glass paint could keep metal roofs and other structures cool even on sunny days", American Chemical Society, [on line], Presented on Aug. 16, 2015, [retrieved from the internet on Apr. 4, 2020], URL <http://phys.org/news/2015-08-glass-metal-roofs-cool-sunny.html>, 4 pages.
(Continued)

*Primary Examiner* — James M Mellott
(74) *Attorney, Agent, or Firm* — Carolyn A. Fischer

(57) ABSTRACT

A method of coating a roofing material is described. The method comprises providing an aqueous roof coating composition comprising an inorganic binder material, a chemical curing agent, inorganic particulate filler; applying the aqueous roof coating composition to an inorganic roofing material; and allowing the aqueous roof coating composition to
(Continued)

dry and chemically curing agent. The roof coating composition has a total solar reflectance of at least 0.7 after allowing the aqueous roof coating composition to dry and chemically cure. Also described are aqueous roof coating compositions and inorganic (e.g. roofing) materials comprising a surface coating having a total solar reflectance of at least 0.7; wherein the surface coating comprises silicate, a chemical curing agent; and inorganic particulate filler.

15 Claims, 1 Drawing Sheet

(51) Int. Cl.
*B05D 3/10* (2006.01)
*B05D 5/06* (2006.01)
*B05D 7/14* (2006.01)
*C09D 1/02* (2006.01)
*E04D 7/00* (2006.01)

(52) U.S. Cl.
CPC ............ *B05D 5/063* (2013.01); *B05D 7/14* (2013.01); *C09D 1/02* (2013.01); *E04D 7/00* (2013.01)

(56) References Cited

U.S. PATENT DOCUMENTS

| | | |
|---|---|---|
| 8,142,531 B2 | 3/2012 | Adefris |
| 8,704,258 B2 | 4/2014 | Tasaki |
| 2005/0074580 A1 | 4/2005 | Gross |
| 2010/0151199 A1 | 6/2010 | Shiao |
| 2010/0203336 A1* | 8/2010 | Shiao .................. C04B 18/021 428/404 |
| 2011/0223385 A1 | 9/2011 | Shiao |
| 2012/0091388 A1* | 4/2012 | Felisari ................ C08J 9/0066 252/62 |
| 2013/0004713 A1 | 1/2013 | Zhou |
| 2014/0248467 A1 | 9/2014 | Shiao |
| 2016/0009938 A1* | 1/2016 | Rokowski ................ C09D 5/00 523/218 |
| 2016/0326746 A1 | 11/2016 | Shiao |

FOREIGN PATENT DOCUMENTS

| | | |
|---|---|---|
| CA | 2876893 | 12/2013 |
| CA | 2545903 | 2/2015 |
| JP | 2017-523275 A | 8/2017 |
| JP | 2017523275 * | 8/2017 |
| WO | 2008-147971 | 12/2008 |
| WO | 2008-147972 | 12/2008 |
| WO | 2009-145968 | 12/2009 |
| WO | 2010-091326 | 8/2010 |
| WO | 2013-192336 | 12/2013 |
| WO | 2014-042987 | 3/2014 |
| WO | 2014-042988 | 3/2014 |
| WO | 2014-043212 | 3/2014 |
| WO | 2015-112590 | 7/2015 |
| WO | 2015-157612 | 10/2015 |
| WO | 2015-157615 | 10/2015 |
| WO | 2016/005397 A1 | 1/2016 |
| WO | WO-2016005397 A1 * | 1/2016 ............ C09D 1/02 |
| WO | 2017-200843 | 11/2017 |
| WO | 2017-200844 | 11/2017 |
| WO | 2018-234942 | 12/2018 |

OTHER PUBLICATIONS

"NRCA Releases 2020 Roofing Manual Set", Paint Square, [on line], Published on Apr. 2, 2020, [retrieved from the internet on Apr. 4, 2020], URL <http://www.durabilityanddesign.com/news/?fuseaction=view&id=13609>, 3 pages.

Levinson, "A novel technique for the production of cool colored concrete tile and asphalt shingle roofing products"; Solar Energy Materials & Solar Cells, Mar. 2010, vol. 94, pp. 946-954.

International Search Report for PCT International Application No. PCT/IB2018/058632, dated Feb. 13, 2019, 5 pages.

* cited by examiner

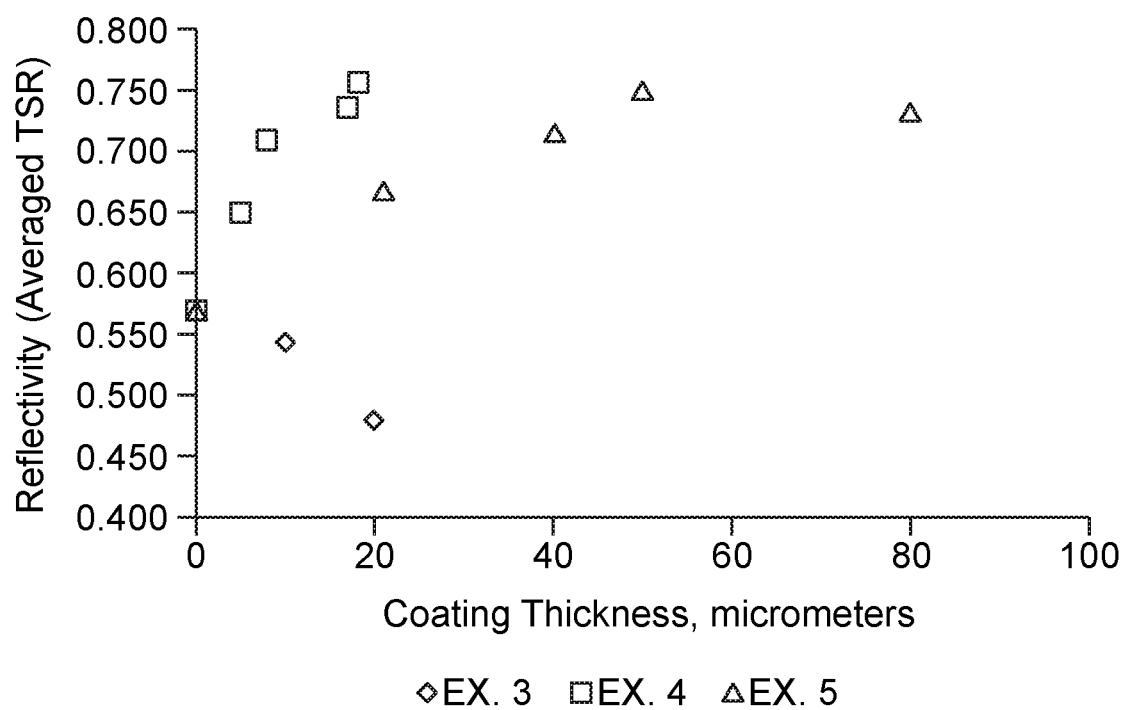

ROOF COATING COMPOSITION, METHODS OF USE, AND ARTICLES

CROSS REFERENCE TO RELATED APPLICATIONS

This application is a national stage filing under 35 U.S.C. 371 of PCT/IB2018/058632, filed Nov. 2, 2018, which claims the benefit of U.S. Application No. 62/584,295, filed Nov. 10, 2017, the disclosure of which is incorporated by reference in its/their entirety herein.

BACKGROUND

As described for example in US 2016/0326746, in recent years, the state of California has implemented a building code requiring the low-sloped roofs to have roof coverings with solar reflectance greater than 70%. To achieve such a high level of solar reflectance, it is necessary to coat the roof with a reflective coating over granulated roofing products, since the granules with current coloring technology are not capable of achieving such high levels of solar reflectance. However, polymeric coatings applied have only a limited amount of service life and will require re-coat after certain years of service. Also, the cost of adding such a coating on roof coverings can be relatively high.

Solar reflective roofing granules have been described. For example, in the abstract of patent application US 2016/0326746, solar reflective roofing granules are described which include a binder and inert mineral particles, with solar reflective particles dispersed in the binder. An agglomeration process preferentially disposes the solar reflective particles at a desired depth within or beneath the surface of the granules.

White roof coatings have also been described. For example, reflective white roof coatings have been described that comprise organic polymeric binders such as acrylics, urethanes, silicones. (e.g. SBS, SEBS) styrenic block copolymers, etc.

SUMMARY

Although various roof coating compositions have been described, the industry would find advantage in roof coating compositions having improved properties.

In one embodiment, a method of coating a roofing material is described. The method comprises providing an aqueous roof coating composition comprising an inorganic binder material, a chemical curing agent, inorganic particulate filler; applying the aqueous roof coating composition to an inorganic roofing material; and allowing the aqueous roof coating composition to dry and chemically curing agent. The roof coating composition has a total solar reflectance of at least 0.7 after allowing the aqueous roof coating composition to dry and chemically cure.

In another embodiment, an inorganic (e.g. roofing) material comprising a surface coating having a total solar reflectance of at least 0.7; wherein the surface coating comprises silicate, a chemical curing agent; and inorganic particulate filler.

Also described are aqueous roof coating compositions.

BRIEF DESCRIPTION OF THE DRAWING

FIG. 1 is a graph of the average total solar reflectance as a function of coating thickness for embodied roof coatings.

DETAILED DESCRIPTION

The roofing coating composition comprises an inorganic binder material. The inorganic hinder material (prior to curing) is typically an inorganic compound having a molecular weight no greater than 1000 g/mole.

One example of an aqueous solution that comprises an inorganic binder material is waterglass. As used herein, the term "waterglass" refers to an aqueous solution of alkali silicate(s) (e.g., sodium, and/or potassium silicate) and combinations thereof. Alkali silicate is the common name for compounds with the formula $(SiO_2)_n(M_2O)$ and their hydrates where n is a positive integer and M is an alkali metal (e.g., sodium or potassium). Alkali silicate comprises more than one oxide ion and thus can be characterized as a polyanion.

Suitable alkali silicates include cesium silicate, lithium silicate, a potassium silicate, or a sodium silicate. Sodium and potassium silicates are commercially available compounds with a $SiO_2:Na_2O(K_2O)$ weight ratio ranging from about 1.6-2.5. Commercial materials are available from PQ Corporation Malvern, Pa. as the trade designations "STAR", "BW50", and "LITHISIL 25". Such materials typically have a solids contents ranging from 23 wt.-% to 45 wt.-% solids or, conversely, a water content ranging from 55 to 77 percent by weight. Hence, when a composition contains 23 grams of BW50 (having a solids content of 26.2 wt.-%), the composition also contains 64.8 grams of water.

Water is typically the primary liquid component of the aqueous composition. In such embodiments, the liquid component comprises at least 50, 60, 70, 80, 90, 95 wt.-% or greater of (e.g. deionized) water. The aqueous solution may further comprise organic cosolvents such as methanol, ethanol, isopropanol, glyme, diglyme, propylene glycol, and/or acetone. The organic cosolvent may be used to adjust the drying time.

In typical embodiments, the aqueous roof coating composition comprises at least 50, 55, 60, 65, 70, 75, 80, 85 or 90 wt.-% water, or in other words, the solids content ranges from about 10 to 50 wt.-%. In some embodiments, the aqueous roof coating composition has a solids content of at least 1.5 or 20 wt.-%. In some embodiments, the aqueous roof coating composition has a solids content no greater than 45, 40, 35, or 30 wt.-%. When the solids content is too low, it is difficult to obtain the desired total solar reflectance (TSR) at low thicknesses (e.g. less than 25 microns). When the solids content is too high, it can be difficult to apply the aqueous roof coating composition.

The concentration of inorganic binder material (e.g. alkali silicate) in the dried and cured roof coating composition typically ranges from 10 wt.-% to 40 wt.-%. In some embodiments, the concentration of inorganic material (e.g. alkali silicate) is at least 11, 12, 13, 14, 15, 16, 17, 18, 19, or 20 wt.-%. In some embodiments, the concentration of inorganic material (e.g. alkali silicate) is no greater than 39, 38, 37, 36, 35, 34, 33, 32, 31, 30 wt.-%'. Lower concentrations of alkali silicate are amenable to achieving high TSR.

In some embodiments, the roof coating composition preferably comprises a chemical curing that can be used to (e.g., irreversibly) harden the inorganic binder material (alkali silicates). Exemplary chemical curing agents include an aluminum phosphate, aluminosilicate (e.g., amorphous aluminosilicate), fluorosilicate, Portland cement, cryolite, calcium salt (e.g., $CaCl_2$), and calcium silicate. In some embodiments, the chemical curing agent is at least one of aluminum phosphate, amorphous aluminosilicate, fluorosilicate, Portland cement, or calcium silicate. In some embodiments, the chemical curing agent is amorphous. In some embodiments, the chemical curing agent includes amorphous aluminosilicate. Exemplary chemical curing agent can be obtained from commercial sources such as Budenheim, Inc., Budenheim, Germany, and Solvay Fluorides, LLC, Houston, Tex.

The concentration of chemical curing agent is typically at least 1, 2, or 3 wt. % ranging up to 10 wt.-% of the total solids (i.e. excluding aqueous solution) of the roof coating composition.

In some embodiments, the roof coating composition comprises a filler that also functions as a chemical curing agent. Aluminosilicate clays, such as metakaolin (MK), is an example of such a filler. Thus, when the roof coating composition comprises metakaolin, additional chemical curing agent are not required. Such aluminosilicate clays have a silica content of at least 50, 55, 60 or 65 wt.-% and typically no greater than 70 wt,%. The alumina content of the clay is typically at least 20 or 25 wt.-% and typically no greater than 35 wt.-%.

When the roof coating composition comprises a filler that also functions as a chemical curing agent, the amount of filler/curing agent (e.g. MK) is typically at least 1, 2, 3, 4, or 5 wt.-% ranging up to 10 wt.-%. In other embodiments, the amount of filler/curing agent (e.g. MK) is at least 10, 15, or 20 wt. % and no greater than 30 or 25 wt.-% of the dried and cured roof coating composition.

Roofing granules are typically fired (in a rotary kiln) at temperatures of at least 200° C. to 500° C. When the step of applying the aqueous roof coating composition to (e.g. clay or ceramic tile) roofing material occur before the roofing material is installed on a roof (or in other words the roofing material has a pre-applied and pre-cured roof coating), the roof coating composition may optionally be fired. Fired alkali silicate compositions, as described herein, may be characterized as "sintered" or "calcined". However, in typical embodiments, the roof coating composition is applied to a pre-existing roof, or in other words to a roofing material that is disposed upon (e.g. attached to) the roof of a building. The temperature of the roofing material when applying the coating is typically above 20° C. After application, the dried and cured roof coating composition may reach temperatures of 120° F. or higher. Even at temperatures ranging up to 130, 140, 150, or 160° F., the dried and cured roof coating will not delaminate from a metal test substrate, such as galvanized steel. In this embodiment, the roof coating composition described herein is typically not sintered (i.e. unsintered) and is not calcined (i.e. uncalcined). Unsintered alkali silicate and uncalcined ore material such as clays can contain from about 10 to about 40 percent volatiles (e.g. moisture). It is surmised that the moisture content can contribute to the elasticity of the dried and cured roof coating composition.

The roof coating composition generally comprises inorganic particulate filler having a sufficiently high TSR such that the dried and cured (e.g. hardened) roof coating composition has a sufficiently high TSR. In typical embodiments, at least 60, 65, 70, 75, 80, 85 or 90 wt.-% of the particulate filler of the dried and cured roof coating composition typically has a TSR of at least 0.85 or 0.90. The TSR of a particulate filler can be determined in the same manner as determining the reflectivity of granules, as further described in the examples.

In some embodiments, such as when the roof coating composition is relatively thin, the roof coating composition comprises solar reflective particles. The solar reflective particles are typically metal oxides, having a refractive index of at least 1.70. As used here, "refractive index" refers to the refractive index at a wavelength of 550 nm. One example of a solar reflective particle, is aluminum oxide, having a refractive index of 1.76-1.77. Other metal oxides include zinc oxide, having a refractive index of 2.0; and barium oxide, having a refractive index of 1.98. As yet another example, titanium dioxide has a refractive index from about 2.48 to 2.61, depending on the crystal structure (2.488—(anatase), 2.583—(brookite), 2.609 (runic)). An example of titanium dioxide that can be employed in the roof coating composition is "$TiO_2RCL9$", having a d(50) particle size of 1.6 micrometer, available from Cristal USA Inc., Hunt Valley, Md. In addition to reflectivity, solar reflective particles, especially thallium dioxide contribute to the opacity of the roof coating composition.

In some embodiments, the concentration of solar reflective particles is typically at least 5 wt.-% a and in typical embodiments at least 6, 7, 8, 9, or 10 wt.-% of the total solids (i.e. excluding water and cosolvent) of the roof coating composition. The concentration of solar reflective particles is typically no greater than 30 wt.-% and in some embodiments, no greater than 29, 28, 27, 26, or 25 wt.-% of the total solids.

In other embodiments, such as thicker coatings, the concentration of solar reflective particles can be less than 5, 4, 3, 2, 1, 0.5, 0.1, or 0.001 wt.-% of the total dried and cured roof coating composition.

In typical embodiments, the roof coating, composition comprises white inorganic particulate fillers that have a refractive index greater than 1.40 but less than 1.70, or in other words less than the refractive index of the solar reflective particles described above. In some embodiments, the refractive index of the inorganic particulate filler is less than 1.65 or 1.60. The additional fillers can contribute to the mechanical strength and durability of the dried and cured coating. In some embodiments, the filler can be characterized as a color extending filler.

Suitable fillers include, for example, aluminium trihydrate, such as available from J.M. Huber Corporation, Edison, N.J. under the trade designation "Micral 632" having a refractive index of 1.57 and a TSR of 0.93; $CaCO_3$, such as commercially available from Imerys, Rosewell, Ga. under the trade designation #10White" having a refractive index of 1.60 and a TSR of 0.91; talc, such as commercially available from Imifabi under the trade designation "HTP2" having a refractive index of 1.54-159 and a TSR of 0.90; feldspar, such as commercially available from Spruce Pine, N.C. having a refractive index of 1.52-1.53 and a TSR of 0.91; and wollastonite ($CaSiO_3$) having a refractive index of 1.62-1.64 and a TSR of 0.9. Various types of silica also have a TSR of 0.85 or greater. For example, fused silica, commercially available from Minco, Midway, Tenn. has a refractive index of 1.40-1.55 and a TSR of 0.94. As another example, pyrogenic silica, commercially available from Vitro Minerals, Conyers, Ga. has a refractive index of 1.46 and a TSR of 0.96.

In some embodiments, the concentration of inorganic particulate filler having a refractive index less than 1.70 is at least 10, 15, 20, 25, 30, or 35 wt.-% of the total solids (i.e. excluding water and cosolvent) of the roof coating composition. The concentration of such lower refractive index particulate filler is typically no greater than 60 wt.-% and in some embodiments, no greater than 59, 58, 57, 56, or 55 wt.-%. The weight ratio of solar reflecting particles to lower refractive index particles can vary. In some embodiments, the weight ratio of lower refractive index particles to solar reflecting particles ranges from 1:1 to 5:1. In some embodiments, the weight ratio of lower refractive index particles to solar reflecting particles is no greater than 4:1, 3:1, or 2:1.

The roof coating composition can optionally comprise 1 to 10 wt. % of various additives including filler having a TSR less than 0.85. For example, a preferred rheology modifying additive is amorphous micro-silica ($SiO_2$), such as hydrophilic fumed silica. Further, (e.g. hollow) glass/ceramic microspheres can be used for reflectivity/scattering enhancement. Depending on the refractive index of the glass/ceramic, such microspheres may be considered solar reflecting particles, as previously described.

Notably, however, the roof coating composition comprises little or no components, such as absorbing iron oxide that will reduce the TSR of the coating over time (e.g. three years after it has been applied to a roofing material).

The components of the roof coating composition are chosen such that the dried and cured composition provides a Total Solar Reflectance (as determined by the test method described in the Examples) of at least 0.70, 0.75, or even at least 0.8. In some embodiments, the Total Solar Reflectance is no greater than 0.90, 0.89, 0.88, 0.87, 0.86, 0.85, 0.84, 0.83, or 0.82.

In one embodiment, the dried and cured roof coating composition has a total solar reflectance of at least 0.7 when disposed at a thickness of 10 microns on a substrate having an average reflectivity of 0.65 or a substrate having an average reflectivity of 0.57. In another embodiment, the dried and cured roof coating composition has a total solar reflectance of at least 0.7 when disposed at a thickness of 150 microns on a substrate having an average reflectivity of 0.26. In some embodiments, the dried and cured roof coating composition has a TSR of at least 0.50 three years after it has been applied to a roofing material.

The particle size of the solar reflecting particles and lower refractive index particulate filler can vary depending on the intended coating thickness of the roof coating, composition as well as the intended application technique. When the inorganic roofing material is metal, the thickness of the dried and cured roof coating composition typically ranges from 5 to 50 microns. In the case of ceramic, cement or clay roofing materials, the thickness of the dried and cured roof coating composition may be greater than 50 microns.

When the roof coating composition is intended to be applied at a thickness of about 10 microns, the D90 particle size of the (e.g. solar reflecting and lower refractive index) particulate filler is typically no greater than 5, 4.5, 4, 3, 3.5, 2.5, 2, 1.5 or 1 micron. By "D90 particle size", it is meant that 90% by volume of the particles have a particle size no greater than such specified value. Thus, the D90 particle size is at least 2 times smaller than the applied coating thickness. In some embodiments, the D90 particle size of the particulate filler is at least 2.5, 3, 3.5, 4, 4.5, 5, 5.5, 6, 6.5, 7, 7.5, 8.5, 9, 9.5 or 10 times smaller than the applied coating thickness. The D90 particle size is typically at least 0.5, 0.6, 0.7, 0.8, 0.9 or 1 micron.

When the roof coating composition is intended to be applied at a thickness of about 25 microns, the D90 particle size of the (e.g. solar reflecting and lower refractive index) particulate filler can be larger, for example, typically no greater than 6.6, 6, 5.5, 5, 4.5, 4, or 3.5 microns.

When roof coating composition is intended to be applied at a thickness of about 50 microns, the D90 particle size of the (e.g. solar reflecting and lower refractive index) particulate filler can be even larger, for example, typically no greater than 10 or 15 microns.

Although it is problematic to prepare thin coatings with compositions containing particulate filler having too large of a particle size, it is not problematic to prepare thick coatings from the roof coating compositions designed to be applied at 10 microns, i.e. comprising smaller particle sizes. Thus, when it is desired to provide a roof coating composition that is suitable for a wide range of thickness, it is preferred to utilize inorganic particulate filler, preferably including solar reflecting particles having an overall D90 particle size no greater than 5, 4.5, 4, 3, 3.5, 2.5, 2, 1.5 or 1 micron. In some embodiments, the lower refractive index inorganic particulate filler and solar reflecting particles are commercially available having the desired particle size. In other embodiments, the lower refractive index inorganic particulate filler and solar reflecting particles can be (e.g. wet or dry) milled to the desired particles size.

In the dried and cured roof coating composition, the particle size of the inorganic particulate filler and solar reflecting particles can be determined using optical microscopy, Scanning Electron Microscopy and the like, in combination with any image analysis software, such as that available as free ware under the trade designation "IMAGE J" from NIH, Bethesda, Md. Suitable microscopy methods are described in ASTM E2651-13 and ASTM E1617-09 (2014).

The roof coating composition can be prepared in any suitable manner. In one embodiment, the method comprises combining an organic binder precursor (e.g. alkali silicate solution) with a chemical curing agent (e.g. metakaolin) and homogenizing in a laboratory impeller mixer. The method further comprises adding the solar reflecting particles (e.g. $TiO_2$ RCL9 pigment) to the slurry and vigorously stirring (e.g. 1000 rpm for 10 minutes). Finally, the method comprises adding all the other powdered components (e.g. inorganic particulate filler having a refractive index of less than 1.70) and stirring vigorously (e.g. for 20-25 min in total).

In an alternative method, dry alkali silicate may be used instead of alkali silicate solution. This method comprises combining the alkali silicate powder with the other powdered components (e.g. solar reflecting pigment, chemical curing agent, inorganic particulate filler having a refractive index of less than 1.70) and homogenizing by co-milling or any other technique that achieves high homogeneity. The method further comprises combining the co-milled mixture of particles with an aqueous liquid.

The roof coating composition is typically dried and cured at temperatures above 20° C., and preferably at temperatures of 40-70° C. Rapid water removal by flash heating can result in a low yield of reaction and formation of microcracks, whereas curing at low temperature (<20° C.) often causes prohibitively slow curing. The alkali silicate is subject to a polycondensation reaction, as known in the art, that leads to the formation of Si—O—(Si, Al, P) covalent network. In this reaction, water plays an important role of transport media and can also act as a leaving group.

The aqueous roof coating composition can be applied by any suitable manner. In some embodiments, the method of applying the aqueous roof coating composition includes painting (e.g. brushing, spraying, rolling). In typical embodiments, the step of applying the aqueous roof coating composition occurs after the roofing material has been installed on disposed on a roof. However, in other embodiments, the step of applying the aqueous roof coating composition can occur prior to installing the roofing material. In this embodiment, the method of applying the aqueous roof coating composition can utilize various other techniques that are suitable for a manufacturing facility such as dip coating, knifecoating etc. Single or multiple layers can be applied to achieve the derived thickness and TSR, as previously described. The dried roof coating composition generally has a thickness ranging from 5 microns to 500 microns. The preferred thickness can vary depending on the specific roofing material, reflectivity of the roofing material, and the composition of the roof coating composition, as previously described.

In some embodiments, the inorganic roofing material may optionally be subjected to an adhesion promoting surface treatment prior to applying the aqueous roof coating composition. For example, the surface of the inorganic (e.g. metal) roofing material may be roughened with sandpaper. Alternatively, a primer composition (e.g. containing an alkoxy silane compound) can be applied.

The roof coating composition is suitable for various inorganic roofing materials, including for example, metal (e.g. aluminum, steel), ceramic, cement, or clay. As used herein, the inorganic roofing material is not a roofing granule. In some embodiments, ceramic roofing materials are distinguished from glass in that ceramic roofing material are typically non-vitrified. Thus, ceramic roofing materials have not been subjected to the process of melting. In other embodiments, ceramic roofing materials are distinguished from glass in view of being crystalline or at least partially crystalline. In contrast, glass is characterized as being non-crystalline or in other words amorphous.

In some embodiments, the method of coating a roofing material further comprises applying a sizing composition (e.g. overcoat, topcoat) to the (e.g. dried) roof coating composition described herein. The sizing composition can seal the surface, thereby reducing porosity and protecting the coating and underlying inorganic roofing material from water degradation.

In some embodiments, the step of applying the sizing occurs before the roof coating composition is completely cured, but has started to solidify. The amount of time it takes for the roof coating composition to achieve this state can vary depending on the composition of the aqueous roof coating composition, the thickness of the coating, the temperature, etc.

In typical embodiments, the sizing composition is also aqueous and comprises an inorganic binder material, such as an alkali (e.g. lithium) silicate and a suitable chemical curing agent (e.g., Fabutit 405/Fabutit 406). The sizing composition can be transparent and thus lack both inorganic particulate filler having a refractive index less than 1.70 and solar reflective particles. Alternatively, the surface sizing material can be white. The white surface sizing composition typically has a low concentration of inorganic particulate filler. For example, the sizing composition typically contain no greater than 20, 15, 10, or 5, 4, 3, 2, or 1 percent by volume of inorganic particulate filler The invention is more particularly described with reference to the nonlimiting examples which follow.

Materials

TABLE 1

| Material | Description | Source |
| --- | --- | --- |
| "STAR" | Sodium silicate solution in water, wt. ratio $SiO_2/Na_2O = 2.5$, solids = 37.1 wt. % | PQ Corporation, Malvern, PA, under the trade designation "STAR" |
| "BW50" | Sodium silicate solution in water, wt. ratio $SiO_2/Na_2O = 1.6$, solids = 26.2 wt. % | PQ Corporation, Malvern, PA, under the trade designation "BW50" |

TABLE 1-continued

| Material | Description | Source |
| --- | --- | --- |
| "LITHTSIL 25" | Lithium silicate solution, wt. ratio $SiO_2/Li_2O = 8.2$, % Solids = 23.0 wt. % | PQ Corporation Malvern, PA, under the trade designation "LITHISIL 25" |
| "METAMAX" | Reactive metakaolin, (anhydrous amorphous aluminosilicate), D90 = 1.3 micrometers | BASF USA, Florham Park, under the trade designation "METAMAX" |
| FABUTIT 748 | aluminum phosphate-based silicate curing agent, $Al_2O_3 = 60$ wt. %, $P_2O_5 = 35$ wt. %, D90 = 3 micrometers (after in-house milling) | BassTech International, Fort Lee, NJ 07024, under the trade designation "FABUTIT 748" |
| "FIREBRAKE ZB" | Hydrated zinc borate, $B_2O_3 = 48.35$ wt. %, $ZnO = 38.13$ wt. %, curing agent, D90 = 1.8 micrometers | Rio Tinto Borates Greenwood Village, CO, under trade designation "FIREBRAKE ZB" |
| CABOSIL M5 | Untreated Fumed silica, rheology additive, D90 = 0.2 micrometers | EVONIC, North Olmsted, Ohio, under trade designation "CABOSIL M5" |
| "TiO₂ RCL9" | Titanium dioxide, Pigment, D50 = 1.6 micrometers, TSR = 0.99 | Cristal USA Inc. Hunt Valley, MD, USA 21030 |
| "MICRAL 632" | Aluminum trihydrate, milled, D50 = 3 micrometers, TSR = 0.93 | J.M. Huber Corporation, Edison, NJ, under trade designation "MICRAL 632" |
| LITHISIL 829 | Potassium lithium silicate solution in water, wt. ratio $SiO_2/K_2O + Li_2O = 2.5$ | PQ Corporation, Malvern, PA, under the trade designation "LITHISIL829" |
| Sodium Fluorosilicate | $Na_2SiF_6$, hardener | Alfa Aesar, Haverhill, MA |
| FABUTIT F758 | Aluminum phosphate, hardener, $P_2O_5 = 78$ wt. %, $Al_2O_3 = 21$ wt. % | Budenheim, Inc., Budenheim, Germany, under trade the designation "FABUTIT F758" |
| OPTIPOZZ | Reactive metakaolin, (anhydrous amorphous aluminosilicate) | Burgers Pigment Company, Sandersville, GA, under the trade designation "OPTIPOZZ" |
| OPIWHITE | Mullite, filler, opacity provider anhydrous crystalline aluminosilicate | Burgers Pigment Company, under the trade designation "OPTIWHITE" |
| VANSIL W50 | Wollastonite, $CaSiO_3$, structural filler | Vanderbilt Minerals LLC, Norwalk, CT, under the trade designation "VANSIL W50" |
| ATH SH 20 | Alumina trihydrate, color extender calcined at 700° C. | DADCO, Lausanne, Switzerland, under the trade designation "ATH SH 20" |
| CaCO3#10 | Calcium carbonate, filler | Imerys, Inc., Cockeysville, MD |
| TiO₂ | Pigment | Alfa Aesar |
| ZnO | Pigment | |

Test Method

Method for Determining Reflectivity

The Examples were tested for total solar reflectance (TSR) using a spectrum reflectometer (obtained as Model SSR-ER v6 from Devices and Services Co., Dallas, Tex.) using a 1.5E air mass setting.

Method for Determining Conformability

To test conformability, coatings were applied on 0.635 mm thick galvanized steel (EX1-EX5) rectangular strips 100 mm×50 mm. After complete drying and sizing, the strips were bent to form a cylinder with radius of 15 mm.

Examples 1-5 (EX1-EX8)

EX1-EX8 samples were prepared by applying a base coating layer on flat solid substrate followed by sizing coat as follows. Slurries for base coating were formulated using raw materials and formulations listed in Table 1 (above) and Table 2 (below), respectively.

First, sodium silicate solution "BW50" (EX1) or "STAR" (EX2-EX8) was combined with metakaolin "METAMAX" and homogenized in a laboratory impeller mixer for 5 minutes. Second, $TiO_2$ RCL9 pigment was added to the slurry and the slurry was stirred at 1000 rpm for 10 minutes. Third, all other powdered components were added in arbitrary order according to the formulation of the example. The slurry was stirred vigorously for 20-25 min in total.

Each batch of slurry of base coating was approximately 100 g. Coating was applied with Mayer rods[i] #6, 48.410 and 434 to achieve various thicknesses on 0.635 mm thick galvanized steel (EX1-EX5) or ceramic tile (EX6 and EX8). Base coating was initially dried and cured at 50° C. overnight (EX1 and EX2) or at RT overnight (EX3-EX8). Dried coating thickness was measured with micrometer (Fowler High Precision, Newton, Mass.).

Sizing solution comprising a homogeneous mixture of 50 parts (by weight) of LITHISIL® 2.5 solution and 1 part of FABUTIT F748 (EX1 and EX2) or a mixture of 16 parts (by weight) of LITHISIL® 25 and 10 part of FIREBRAKE ZB (EX3-EX8) was applied with Mayer rod 46 and the construction was cured for the next 24 hours at 50° C.

Reflectivity was measured and averaged for at least 4 points at a given coating thickness. The composition and testing results of each of EX1-EX8 are summarized in Table 2 and FIG. 1.

TABLE 2

Examples of Chemically Cared Unsintered Roof Coatings

| | EX1 | EX2 | EX3 | EX4 | EX5 | EX6 | EX7 | EX8 |
|---|---|---|---|---|---|---|---|---|
| Base Coat Components (solids), wt. % | | | | | | | | |
| BW50 | 23.0 | | | | 0 | | | |
| "STAR" | 0 | 23.0 | | | 25.8 | | | |
| "METAMAX" | 23.0 | 23.0 | | | 5.8 | | | |
| "FIREBRAKE ZB" | 0 | 0 | | | 1.9 | | | |
| CABOSIL M5 | 4.0 | 4.0 | | | 0.77 | | | |
| "MICRAL 632" | 35.0 | 35.0 | 65.7 | 52.7 | 42.7 | 65.7 | 52.7 | 42.7 |
| $TiO_2$ RCL-9 | 15.0 | 15.0 | 0 | 13 | 23 | 0 | 13 | 23 |
| Solid content, wt. % | 53 | 61 | | | 59 | | | |
| Sizing Components (solids), wt. % | | | | | | | | |
| "LITHISIL25" | 92 | | | | 79 | | | |
| "FIREBRAKE ZB" | 0 | | | | 21 | | | |
| "FABUTIT 748" | 8 | | | | 0 | | | |
| Solid content, wt. % | 24 | | | | 27 | | | |
| Sizing/Coat wt. ratio | 0.33-0.43 | | | | Not determined | | | |
| Average Reflectivity of substrate/Substrate | 0.65 Galvanized Steel | | 0.57 Galvanized Steel** | | | 0.36 Unglazed ceramic tile | | |
| Average Reflectivity at dried coating thickness 5-10 microns | Not determined | | 0.56 | 0.68 | ND* | Not determined | | |
| Average Reflectivity at dried coating thickness 10-25 microns | | | 0.51 | 0.75 | 0.71 | | | |
| Average reflectivity at dried coating thickness 25-50 microns | 0.81 | 0.79 | Not determined | | 0.74 | | | |
| Average reflectivity at dried coating thickness 130-150 microns | | | Not determined | | | 0.60 | 0.76 | 0.73 |

ND*—Not Determined
**The surface was roughened with sandpaper thereby reducing the average reflectivity.

All samples coated on galvanized steel total coating thickness≤50 microns were evaluated for conformability as described above. The sample did not exhibit any cracking or delamination and therefore passed the conformability test

TABLE 3

Examples of Pre-Applied Sintered Roof Coatings for Ceramic or Clay Tile

| Component | EX9 | EX10 | EX11 | EX12 |
|---|---|---|---|---|
| LITHISIL 829 | 0 | 33.7 | 0 | 0 |
| BW50 | 32.71 | 0 | 25.3 | 0 |
| STAR | | | | 18.8 |
| $Na_2SiF_6$ | 5.61 | 0 | 0 | 0 |
| OPTIPOZZ | | | | 7 |
| VANSIL W50 | 18.69 | 11.2 | 12.6 | 0 |
| FABUTIT F758 | 0 | 4.5 | 4.5 | 0 |
| ATH | 37.38 | 45 | 50.6 | 0 |
| OPTIWHITE | 0 | 0 | 0 | 20.3 |
| CaCO3#10 | 0 | 0 | 0 | 15.8 |
| $TiO_2$ | 0 | 5.61 | 6.32 | 0 |
| ZnO | 5.6 | 0 | 0 | 0 |
| Additional Water | 0 | 0 | 0 | 38 |
| Temperature of curing stage 1: up to 60° C. @ a heating rate of 10° C./min. | | yes | | no |

TABLE 3-continued

Examples of Pre-Applied Sintered Roof Coatings for Ceramic or Clay Tile

| Component | EX9 | EX10 | EX11 | EX12 |
|---|---|---|---|---|
| Temperature of curing stage 1: up to 80° C. @ a heating rate of 10° C./min |  | no |  | yes |
| Temperature of curing stage 2: up to 150° C. @ a heating rate of 10° C./min. |  | yes |  | no |
| Temperature of curing stage 2: up to 450° C. @ a heating rate of 10° C./min. |  | no |  | yes |

Examples 1-4 were prepared into granules as described in US PCT Application No. PCT/US2017/032209; incorporated herein by reference. The cup reflectivity was measured using a spectrum reflectometer (obtained as Model SSR-ER v6 from Devices and Services Co., Dallas, Tex.) using a 1.5E air mass setting. For "Cup" measurements, granules were loaded into a sample holder with a depth of approximately 5 mm. The surface of the granules was leveled using a roller. The cup reflectivity was as follows:

TABLE 3

| Example/Property | EX9 | EX10 | EX11 | EX12 |
|---|---|---|---|---|
| Cup reflectivity (solar spectrum) | 0.75 | 0.75 | 0.72 | 0.82 |

In view of the reported cup reflectivity, sufficiently thick coatings of these compositions would provide a TSR of at least 0.7. Examples 1-3 contain sufficient amount of chemical curing agent to cure without heating and sintering. Additional chemical curing agent can be added to EX. 4 such that it will also chemically cure without heating and sintering.

What is claimed is:

1. A method of coating a roofing material comprising:
   providing an aqueous roof coating composition comprising:
   an alkali silicate inorganic binder material;
   a chemical curing agent;
   inorganic particulate filler;
   applying the aqueous roof coating composition to an inorganic roofing material that is disposed upon the roof of a building; and
   allowing the aqueous roof coating composition to dry and chemically cure;
   wherein the roof coating composition is not sintered and has a total solar reflectance of at least 0.7 after allowing the aqueous roof coating composition to dry and chemically cure.

2. The method of claim 1 wherein the inorganic roofing material is metal, ceramic, cement, or clay.

3. The method of claim 2 wherein the metal is aluminum or steel.

4. The method of claim 1 wherein roof coating composition has a thickness ranging from 5 microns to 500 microns after allowing the aqueous roof coating composition to dry and chemically cure.

5. The method of claim 1 wherein the inorganic roofing material is metal and the aqueous roof coating composition coating has a thickness ranging from 5 to 50 microns after allowing the aqueous roof coating composition to dry and chemically cure.

6. The method of claim 1 wherein after allowing the aqueous roof coating composition to dry and chemically cure the roof coating composition has a total solar reflectance of at least 0.7 when disposed at a thickness of 10 microns on a substrate having an average reflectivity of 0.65 or a substrate having an average reflectivity of 0.57.

7. The method of claim 1 wherein after allowing the aqueous roof coating composition to dry and chemically cure the roof coating composition has a total solar reflectance of at least 0.7 when disposed at a thickness of 150 microns on a substrate having an average reflectivity of 0.26.

8. The method of claim 1 wherein after allowing the aqueous roof coating composition to dry and chemically cure the roof coating composition comprises 15 wt.-% to 30 wt.-% of alkali silicate based on the wt. % solids of the dried aqueous roofing coating composition.

9. The method of claim 1 wherein the inorganic particulate filler comprises inorganic particulate filler having a refractive index less than 1.70 has a total solar reflectance of at least 0.85.

10. The method of claim 1 wherein after allowing the aqueous roof coating composition to dry and chemically cure the roof coating composition comprises 10 wt.-% to 25 wt.-% of solar reflective particles.

11. The method of claim 10 wherein the weight ratio of alkali silicate to solar reflective particles ranges from about 2:1 to 1:1.

12. The method of claim 1 wherein 90% by volume of the inorganic particulate filler has an average particle size of less than 5, 4, or 3 microns.

13. The method of claim 1 wherein the roof coating composition comprises an aluminosilicate clay as a chemical curing agent and as an inorganic particulate filler.

14. The method of claim 1 wherein the method further comprises applying a sizing composition comprising an inorganic binder material to the roof coating composition.

15. The method of claim 14 wherein the sizing composition comprises an inorganic binder and a chemical curing agent.

* * * * *